United States Patent
Conrad et al.

(10) Patent No.: US 6,238,451 B1
(45) Date of Patent: May 29, 2001

(54) VACUUM CLEANER

(75) Inventors: Wayne Ernest Conrad; Helmut Gerhard Conrad, both of Hampton (CA)

(73) Assignee: Fantom Technologies Inc., Welland (CA)

( * ) Notice: Subject to any disclaimer, the term of this patent is extended or adjusted under 35 U.S.C. 154(b) by 0 days.

(21) Appl. No.: 09/227,712

(22) Filed: Jan. 8, 1999

(51) Int. Cl.[7] ...................................................... B03C 3/36
(52) U.S. Cl. .................................. 55/323; 55/337; 55/342; 55/343; 55/346; 55/349; 55/459.1; 55/DIG. 3; 96/61; 96/63
(58) Field of Search ............................ 55/342, 343, 345, 55/346, 349, 350.1, DIG. 3, 337, 459.1, 323, 347; 15/347; 96/61, 63

(56) References Cited

U.S. PATENT DOCUMENTS

| | | |
|---|---|---|
| Re. 32,257 | 10/1986 | Dyson . |
| 3,425,192 | 2/1969 | Davis . |
| 4,049,400 | 9/1977 | Bennett et al. . |
| 4,229,187 | 10/1980 | Stockford et al. . |
| 4,344,776 | 8/1982 | Yavnieli . |
| 4,373,228 | 2/1983 | Dyson . |
| 4,406,678 | 9/1983 | Neugart . |
| 4,518,402 | 5/1985 | Dargel . |
| 4,571,772 | 2/1986 | Dyson . |
| 4,573,236 | 3/1986 | Dyson . |
| 4,593,429 | 6/1986 | Dyson . |
| 4,643,748 | 2/1987 | Dyson . |
| 4,749,386 | 6/1988 | Strohmeyer et al. . |
| 4,826,515 | 5/1989 | Dyson . |
| 4,828,586 | 5/1989 | Joannou . |
| 4,853,008 | 8/1989 | Dyson . |
| 4,853,011 | 8/1989 | Dyson . |
| 4,902,306 | 2/1990 | Burnett et al. . |
| 5,062,870 | 11/1991 | Dyson . |
| 5,069,691 | 12/1991 | Travis et al. . |
| 5,078,761 | 1/1992 | Dyson . |
| 5,090,976 | 2/1992 | Dyson . |
| 5,143,524 | 9/1992 | Inculet et al. . |
| 5,145,499 | 9/1992 | Dyson . |
| 5,160,356 | 11/1992 | Dyson . |
| 5,230,723 | 7/1993 | Travis et al. . |
| 5,254,147 * | 10/1993 | Finke ................................ 55/DIG. 3 |
| 5,255,411 | 10/1993 | Da Costa . |
| 5,259,854 * | 11/1993 | Newman .......................... 55/DIG. 3 |
| 5,267,371 | 12/1993 | Soler et al. . |
| 5,307,538 * | 5/1994 | Rench et al. ....................... 55/DIG. 3 |
| 5,336,299 | 8/1994 | Savell . |
| 5,358,290 | 10/1994 | Fleet et al. . |
| 5,376,168 | 12/1994 | Inculet . |
| 5,400,465 | 3/1995 | Bosses .................................... 15/339 |
| 5,405,434 | 4/1995 | Inculet . |
| 5,433,763 | 7/1995 | Shagott et al. . |
| 5,558,697 | 9/1996 | Dyson et al. . |
| 5,574,493 | 11/1996 | Sanger et al. . |

(List continued on next page.)

FOREIGN PATENT DOCUMENTS

| | | |
|---|---|---|
| 2221499 | 11/1995 | (CA) . |
| 0 908 121 A1 | 7/1997 | (EP) . |
| 0 815 788 A2 | 1/1998 | (EP) . |
| 0 815 788 A2 | 7/1998 | (EP) . |
| 0 815 788 A3 | 2/1999 | (EP) . |
| 0 908 121 A1 | 4/1999 | (EP) . |

Primary Examiner—Richard L. Chiesa
(74) Attorney, Agent, or Firm—Philip C. Mendes da Costa; Bereskin & Parr

(57) ABSTRACT

A method for filtering a dirty air stream in a vacuum cleaner to obtain a clean air stream has subjecting the dirty air stream to a first cyclonic separation stage to obtain a partially cleaned air stream and subjecting the partially cleaned air stream to a second cyclonic separation stage and an electronic filtration stage to obtain the clean air stream.

15 Claims, 3 Drawing Sheets

U.S. PATENT DOCUMENTS

| | | | |
|---|---|---|---|
| 5,593,479 | | 1/1997 | Frey et al. .............................. 96/57 |
| 5,656,063 | | 8/1997 | Hsu . |
| 5,725,623 | * | 3/1998 | Bowerman et al. .............. 55/DIG. 3 |
| 5,840,102 | * | 11/1998 | Dyson ...................................... 96/61 |
| 5,846,302 | | 12/1998 | Putro . |
| 6,010,561 | * | 1/2000 | Dyson ...................................... 96/63 |

\* cited by examiner

"PRIOR ART"

VACUUM CLEANER

FIELD OF THE INVENTION

This invention relates to vacuum cleaners which have a cyclonic separation apparatus.

BACKGROUND OF THE INVENTION

Cyclone separators, which are sometimes referred to merely as cyclones, are devices that utilize centrifugal forces and low pressure caused by spinning motion to separate materials of differing density, size and shape. FIG. 1 illustrates the operating principles in a typical cyclone separator (designated by reference numeral 10 in FIG. 1). The following is a description of the operating principles of cyclone separator 10 in terms of its application to removing entrained particles from an air stream in a vacuum cleaner.

Cyclone separator 10 has an inlet pipe 12 and a main body comprising upper cylindrical portion 14 and lower frusto-conical portion 16. The particle laden air stream is injected through inlet pipe 12 which is positioned tangentially to upper cylindrical portion 14. The shape of upper cylindrical portion 14 and frusto-conical portion 16 induces the air stream to spin creating a vortex. Larger or more dense particles are forced outwards to the walls of cyclone separator 10 where the drag of the spinning air as well as the force of gravity causes them to fall down the walls into an outlet or collector 18. The lighter or less dense particles, as well as the air medium itself, reverses course at approximately collector G and pass outwardly through the low pressure centre of separator 10 and exit separator 10 via air outlet 20 which is positioned in the upper portion of upper cylindrical portion 14.

The separation process in cyclones generally requires a steady flow free of fluctuations o. short term variations in the flow rate. The inlet and outlets of cyclone separators are typically operated open to the atmosphere so that there is no pressure difference between the two. If one of the outlets must be operated at a back pressure, both outlets would typically be kept at the same pressure.

When a cyclone separator is designed, the principal factors which are typically considered are the efficiency of the cyclone separator in removing particles of different diameters and the pressure drop associated with the cyclone operation. The principle geometric factors which are used in designing a cyclone separator are the inlet height (A); the inlet width (B); the air outlet diameter (C); the outlet duct length (D); the cone height (Lc); the dirt outlet diameter (G); and, the cylinder height (L)

The value $d_{50}$ represents the smallest diameter particle of which 50 percent is removed by the cyclone. Current cyclones have a limitation that the geometry controls the particle removal efficiency for a given particle diameter. The dimensions which may be varied to alter the $d_{50}$ value are features (A)–(D), (G), (L) and (Lc) which are listed above.

Typically, there are four ways to increase the small particle removal efficiency of a cyclone. These are (1) reducing the cyclone diameter; (2) reducing the outlet diameter; (3) reducing the cone angle; and (4) increasing the body length. If it is acceptable to increase the pressure drop, then an increase in the pressure drop will (1) increase the particle capture efficiency; (2) increase the capacity and (3) decrease the underflow to throughput ratio.

In terms of importance, it appears that the most important parameter is the cyclone diameter. A smaller cyclone diameter implies a smaller $d_{50}$ value by virtue of the higher cyclone speeds and the higher centrifugal forces which may be achieved. For two cyclones of the same diameter, the next most important design parameter appears to be L/d, namely the length of the cylindrical section 14 divided by the diameter of the cyclone and Lc/d, the length of the conical section 16 divided by the width of the cone. Varying L/d and Lc/d will affect the $d_{50}$ performance of the separation process in the cyclone.

Due to its intended use, a vacuum cleaners is designed to filter particles of varying sizes from an air stream. With most vacuum cleaners on the market, a filter material such as a paper bag is used to filter the air. The bag will remove from the air stream any particle larger than the size of the pore in the bag. Thus only a single stage of filtration may be employed. However, if a cyclone is used in a vacuum cleaner, then multiple filtration stages may be employed. This is due to the fact that particle sizes which are generally to be filtered by a vacuum cleaner take on a spectrum of values that necessitates that a plurality of cyclonic separators be used in a series. For example, the first cyclonic separator in a series may have a large $d_{50}$ specification followed by one with a smaller $d_{50}$ specification.

For example, in U.S. Pat. No. 3,425,192, a vacuum cleaning assembly was disclosed which used a first frusto-conical cyclone and six secondary cyclones.

More recently, cyclonic technology has been improved and introduced commercially into canister and upright vacuum cleaners. See for example U.S. Pat. Nos. 4,373,228; 4,571,772; 4,573,236; 4,593,429; 4,643,748; 4,826,515; 4,853,008; 4,853,011; 5,062,870; 5,078,761; 5,090,976; 5,145,499; 5,160,356; 5,255,411; 5,358,290; 5,558,697; and RE 32,257. These patents disclose a novel approach to vacuum cleaner design in which sequential cyclones are utilized as the filtration medium for a vacuum cleaner. Pursuant to the teaching of these patents, the first sequential cyclone is designed to be of a lower efficiency to remove only the larger particles which are entrained in an air stream. The smaller particles remain entrained in the air stream and are transported to the second sequential cyclone which is frusto-conical in shape. The second sequential cyclone is designed to remove the smaller particles which are entrained in the air stream. If larger particles are carried over into the second cyclone separator, then they will typically not be removed by the cyclone separator but exit the frusto-conical cyclone with the air stream.

One disadvantage of cyclonic vacuum cleaners is the amount of power which is required to create an air flow sufficient to convey the dirty air through the cyclones at sufficient speeds to maintain the air flowing cyclonically through the cyclones.

SUMMARY OF THE INVENTION

In accordance with the instant invention, there is provided a vacuum cleaner comprising:
(a) a dirty air inlet for receiving air containing dirt, a clean air outlet, an air flow path extending downstream from the dirty air inlet to the clean air outlet and a filtration assembly positioned in the air flow path, the filtration assembly comprising:
  (i) at least one first cyclone in flow communication with the dirty air inlet and having a partially cleaned air outlet;
  (ii) at least one second cyclone having a treated air inlet and a treated air outlet, the treated air inlet in flow communication with the partially cleaned air outlet; and, (iii) at least one electrostatic filter positioned in the air flow path upstream from the first cyclone and downstream of the clean air outlet.

In one embodiment, the electrostatic filter is positioned in the air flow path upstream of the at least one second cyclone. Alternately, or in addition, the electrostatic filter is positioned in the air flow path downstream of the at least one second cyclone. The filter is an electrostatic precipitator.

In another embodiment, the vacuum cleaner has one first cyclone and from two to five second cyclones.

In another embodiment, the at least one second cyclone removes particulate material larger than that which is removed by the electrostatic filter.

In accordance with the instant invention, there is also provided a vacuum cleaner for receiving and cleaning a dirty air stream to obtain clean air comprising:

(a) first means for cyclonically treating the dirty air stream to obtain a partially cleaned air stream;

(b) second means for further cyclonically treating the dirty air stream positioned upstream from the first means for cyclonically treating a dirty air stream; and, (c) electronic filtering means positioned upstream from the first means for cyclonically treating a dirty air stream.

In accordance with the instant invention, there is also provided a method for filtering a dirty air stream in a vacuum cleaner to obtain a clean air stream comprising:

(a) subjecting the dirty air stream to a first cyclonic separation stage to obtain a partially cleaned air stream; and (b) subjecting the partially cleaned air stream to a second cyclonic separation stage and an electronic filtration stage to obtain the clean air stream.

In one embodiment, the method further comprises subjecting the partially cleaned air stream to the second cyclonic separation stage to obtain a treated air stream and subjecting the treated air stream to the electronic filtration stage to obtain the clean air stream. Alternately, or in addition, the method further comprises subjecting the partially cleaned air stream to the electronic filtration stage to obtain a treated air stream and subjecting the treated air stream to the second cyclonic separation stage to obtain the clean air stream.

In another embodiment, the dirty air stream includes particulate material having various particle sizes and second cyclonic separation stage removes larger particles than those removed by the electronic filtration stage.

BRIEF DESCRIPTION OF THE DRAWINGS

These and other advantages of the instant invention will be more fully and particularly understood in connection with the following description of the preferred embodiments of the invention in which.

DETAILED DESCRIPTION OF THE PREFERRED EMBODIMENT

The filter assembly of the instant invention may be used in conjunction with any vacuum cleaner. For example, the filter assembly may be used for an upright vacuum cleaner, a canister vacuum cleaner or a central vacuum cleaner. The dirty air stream which is processed using the filter assembly described herein may be collected by, for example, a wand or rotating brush positioned in the head of a vacuum cleaner as is known in the art. Such dirty air streams typically comprise dirt of varying particle sizes entrained in an air stream. It will be appreciated that the invention may also be used with a wet/dry vacuum cleaner.

Figure 1:
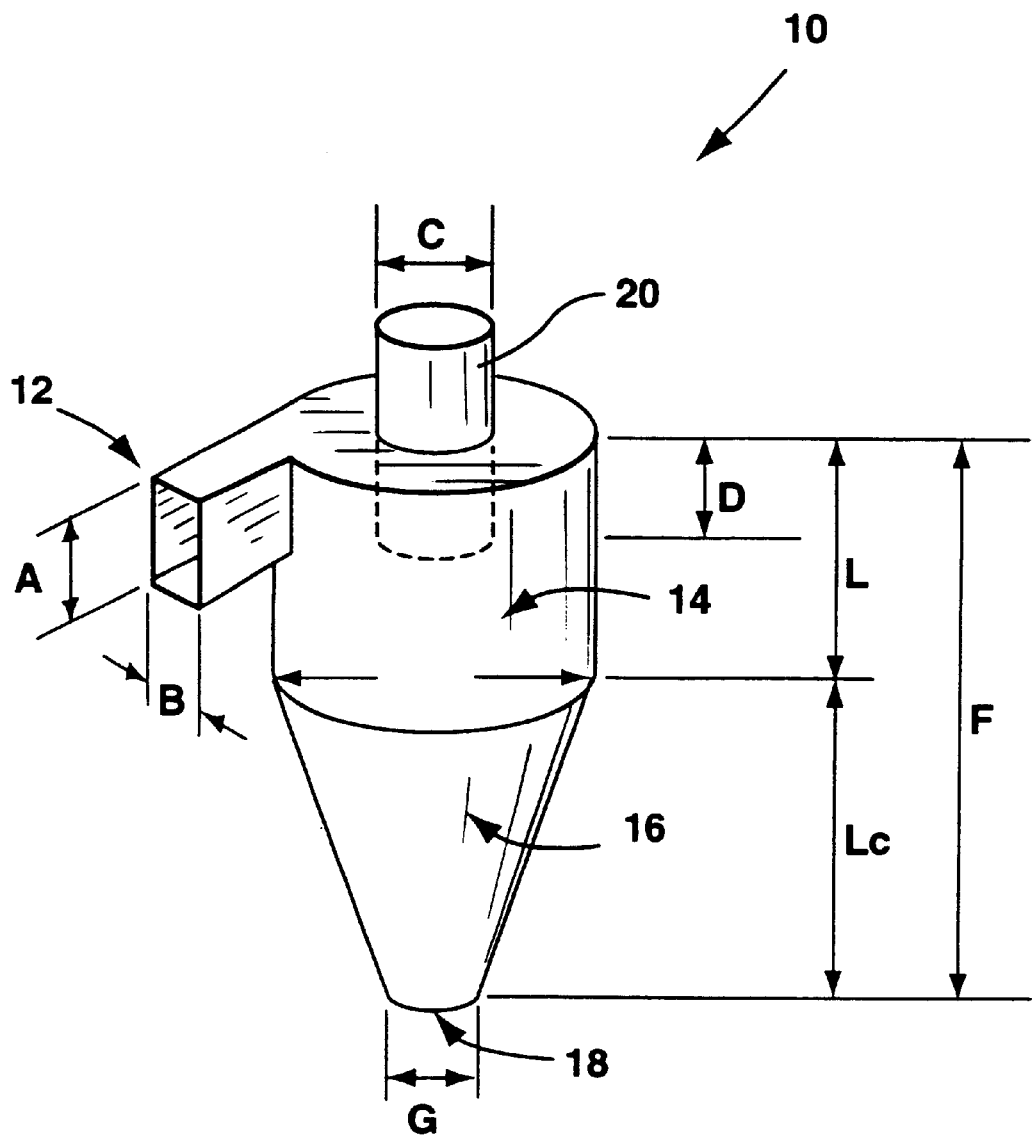
FIG. 1 is a cyclone separator as is known in the art.
Figure 2:
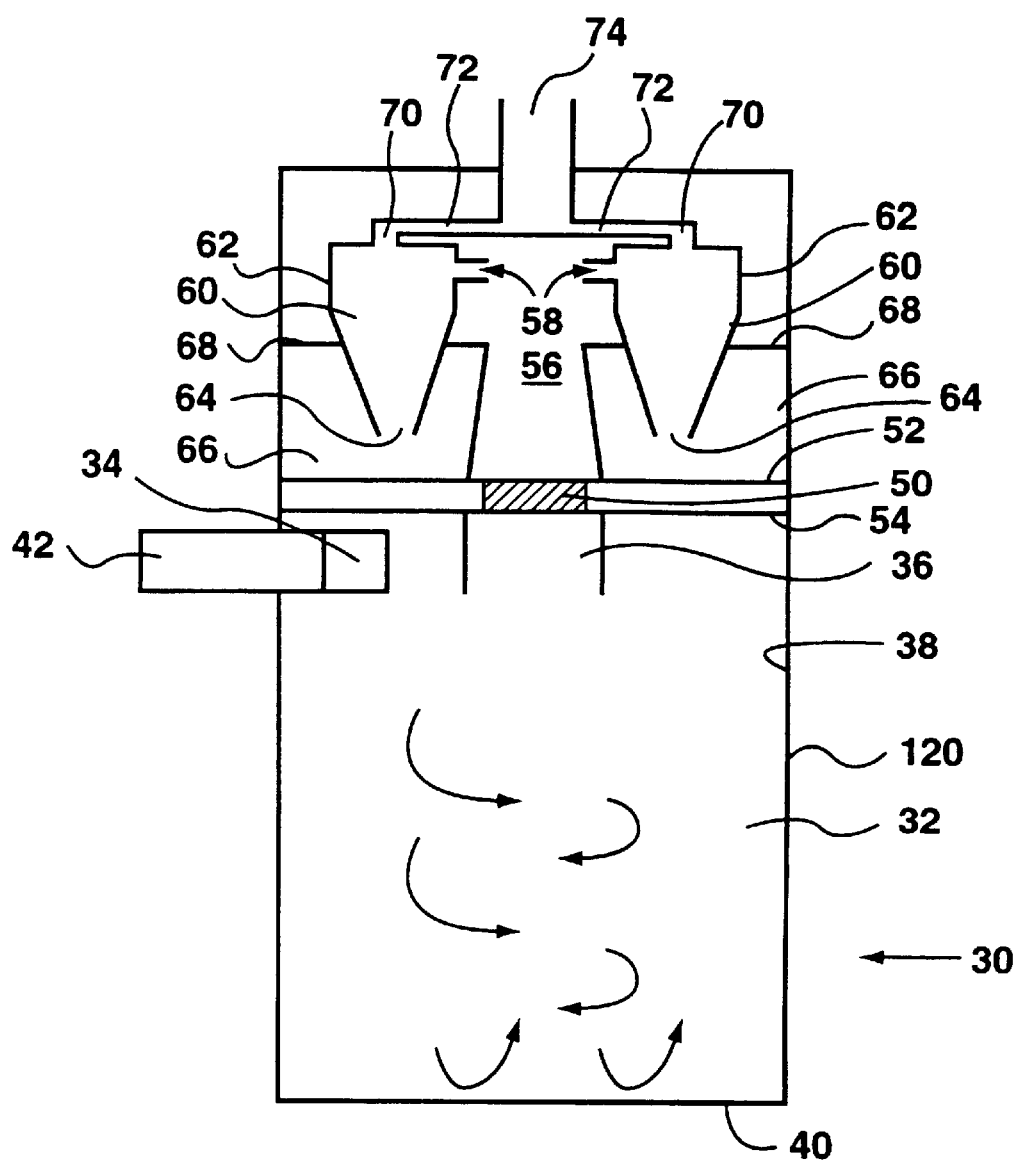
FIG. 2 is a perspective view of a filter assembly for a vacuum cleaner according to the instant invention; and, FIG. 3 is a perspective view of an alternate embodiment of the filter assembly for a vacuum cleaner according to the instant invention.

Referring to FIG. 2, the vacuum cleaner has a filter assembly 30 comprising a first stage cyclone 32. First stage cyclone 32 may, if desired, comprise a plurality of individual cyclones through which the air passes either in sequence or in parallel. Preferably, filter assembly 30 uses only one first cyclone 32. Such a single cyclone may be designed to remove approximately 90% of the particle matter in the air stream entrained by the vacuum cleaner.

The dirty air may be introduced into first cyclone 32 by any means known in the art. The dirty air is introduced tangentially into cyclone 32 by an inlet 34. Referring to FIG. 2, the dirty air is introduced tangentially into cyclone 32 via inlet 34. Inlet 34 is in communication with the source of dirty air via inlet conduit 42. Inlet conduit 42 may be of any configuration known in the art which will convey the dirty air from a source (eg. a cleaning wand or the floor engaging head of a vacuum cleaner) to inlet 34. The dirty air travels around cyclone 32 towards bottom 40. At one point, the air travels upwardly adjacent the central portion of cyclone 32 to exit cyclone 32 by outlet 36. As shown herein, outlet 36 comprises an annular member which extends downwardly into the upper portion of cyclone 32 so as to prevent the partially cleaned air travelling upwardly through outlet 36 from mixing with the dirty air introduced via inlet 34.

As shown in FIG. 2, the partially cleaned air exiting first stage cyclone 32 via outlet 36 is next passed through an electronic filter 50. Filter 50 may be positioned in air flow communication with outlet 36 in any manner. As shown in FIG. 2, filter 50 is held in position in the air flow path by upper and lower panels 52 and 54.

Cyclone 32 is preferably removable from the vacuum cleaner by any means known in the art. Accordingly, cyclone 32 may comprise a container having bottom 40 and side walls 38. When the container comprising bottom 40 and sidewalls 38 is positioned in the vacuum cleaner, it may abut against lower panel 54 in sealing engagement so as to provide an air tight enclosure but for outlet 36. It will be appreciated that container 32 may be of any particular configuration. As shown in the cross section of FIG. 2, container 32 is cylindrical in shape.

Electronic filter 50 may be removable so that it may be cleaned, such as by rinsing with water to remove the particulate matter which is collected thereon. Electronic filter 50 may be of any particular construction known in the art. Various constructions for electrostatic devices which use charged regions to remove particulate matter from an air stream are known. In a particular preferred embodiment, electronic filter 50 comprises an electrostatic precipitator. The electrostatic filter is preferably designed to remove the smallest portion of the particulate matter from the air stream (eg. up to 30 microns). However, the actual level of filtration which may be achieved by the electrostatic filter will vary depending upon the design of filter 50.

The further cleaned air which exists electronic filter 50 passes through outlet 56 to a plurality of second stage cyclones 60. The number of second stage cyclones may vary depending upon, inter alia, the type of particulate matter which is to be filtered, the degree of separation which is required and the amount of pressure drop which is acceptable based upon the motor which is provided to the vacuum cleaner. Second cyclone 60 may be of any particular design known in the art and may be the same or different from first stage cyclone 32. Further, each second stage cyclone 60 need not be the same.

As shown in FIG. 2, each cyclone 62 has an inlet port 58 for introducing air tangentially into the cyclone. Inlet port 58 may be of any particular construction. The air travels through cyclone 60 and dirt which is separated during the passage of air through cyclone 60 exits cyclone 60 via dirt outlet 64. This dirt may be collected in a dirt collection chamber 66. The top of collection chamber 66 is provided by upper plate 68 which forms a seal with wall 62 of cyclone 60. Accordingly, chamber 66 may be defined by upper plate 68, upper panel 52 and the wall of outlet 56. Collection chamber 66 may comprise an annular band extending around the interior of filter assembly 30. Alternately, it may extend only part way around the inner circumference of filter assembly 30 so that a single collection chamber 66 is provided for each cyclone 60. The treated air exits cyclone 60 via outlet 70 which is positioned at the upper end thereof. The treated air may be removed from filter assembly 30 via passage 71 which connects in flow communication with clean air outlet 74.

Clean air 74 may be fed, if desired, to further filtration means, such as additional cyclones (i.e. third stage cyclones) or a HEPA™ filter.

Figure 3:
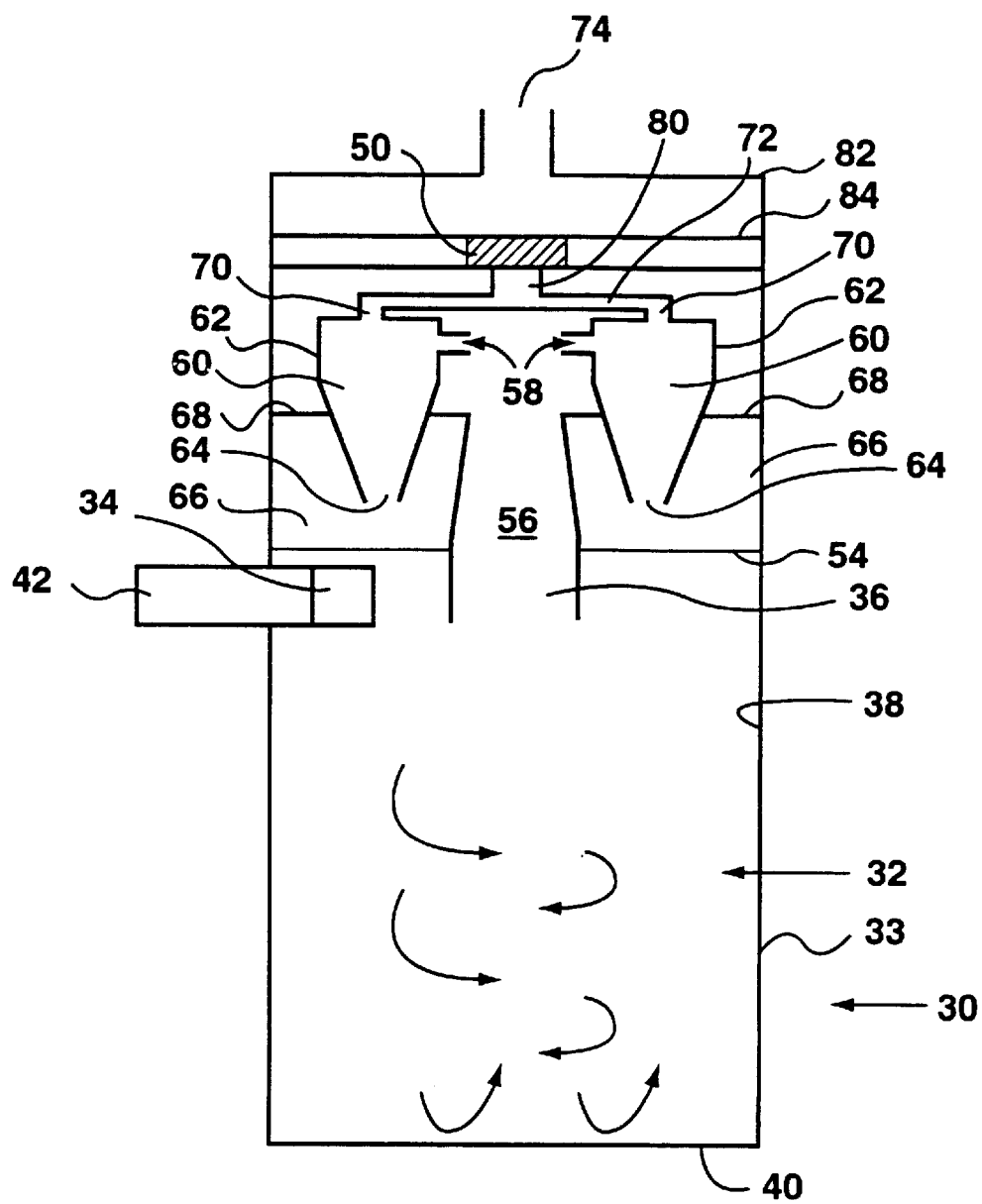

In the alternate embodiment shown in FIG. 3, filter 50 is positioned downstream from second stage cyclones 60. According to this embodiment, the partially cleaned air exits first stage cyclone 32 via outlet 36 and travels through outlet 56 to inlet 58 to second stage cyclones 60. The treated air exits second cyclone 60 via outlet 70. The treated air is then fed to an electronic filter 50 via, for example, passages 71 which combine to form outlet 80 which is in communication with filter 50. The clean air exits filter 50 and travels outwardly from the filter assembly 30 via clean air outlet 74.

In order to achieve high levels of particle removal, cyclonic vacuum cleaners which are currently on the market incorporate a HEPA™ filter. Such filters are effective in removing small particulate matter from the air stream so that the air which exits the vacuum cleaner is essentially for refiltered. One disadvantage of such HEPA™ filters is that they provide substantial resistance to the flow of air therethrough. By removing the HEPA™ filter, the pressure drop which occurs during the passage of the air through the filter assembly of a vacuum cleaner may be reduced by, eg., up to 20%. Accordingly, by removing the HEPA™ filter, the flow rate through the vacuum cleaner may be substantially increased and/or the size of the motor may be reduced by eg., up to 20%. However, the amount of particulate matter which will be contained in the dirty air stream will be increased.

The instant invention provides an alternate approach to the use of such HEPA™ filters. Electrostatic filters generally provide minimal resistance to the flow of air and accordingly do not generally provide much of the pressure drop as an air stream passes therethrough. Electrostatic filter 50 may be designed to remove the same size particles as are removed by the HEPA™ filter which is currently in use. Alternately, electrostatic filter 50 may be designed to remove even larger particles. Accordingly, by using an electrostatic filter, the pressure drops for a vacuum cleaner may be substantially reduced (compared to a vacuum cleaner using a HEPA™ filter). Further, the electrostatic filter may provide enhanced particle remover compared to even a HEPA™ filter and accordingly clean air outlet 74 may produce air which is even cleaner than that which is achieved from commercially available cyclonic vacuum cleaners which even incorporate at HEPA™ filter.

As will be appreciated, the electrostatic filter comprises the portion of filter assembly 30 to remove the small particles from the dirty air stream. First stage cyclone 32 is configured to remove the coarsest particles from the air stream. Accordingly, by the inclusion of electrostatic filter 50, second stage cyclones 60 may be configured to remove the particles which are not filtered by either the first stage cyclone 32 or filter 50. As second stage cyclones 60 need not be designed to remove the finest particulate matter, they may be of a lower efficiency then would otherwise by useable and accordingly may have a larger diameter. By increasing the diameter of second stage cyclones 60, the pressure drop across each cyclone 60 will be reduced thereby producing a further reduction in the pressure drop which occurs by the passage of air through filter assembly 30 and further reducing the power (size of motor) which is required.

In the preferred embodiment of FIG. 2, filter 50 is positioned between the first and second cyclonic stages. Accordingly, the finest particulate matter is removed prior to the second stage cyclonic treatment of the air. The removal of the fine particulate matter at this stage prevents this particulate matter entering cyclone 60 and contaminating the interior surface of wall 62 of cyclone 60.

We claim:

1. A vacuum cleaner for receiving and cleaning a dirty air stream to obtain clean air comprising:
   a. a dirty air inlet for receiving air containing dirt;
   b. a clean air outlet spaced for the dirty air inlet;
   c. an air flow path extending downstream from the dirty air inlet to the clean air outlet and in communication with a source of suction;
   d. first means for cyclonically treating the dirty air stream to obtain a partially cleaned air stream;
   e. second means for further cyclonically treating the dirty air stream positioned downstream from the first means for cyclonically treating a dirty air stream; and,
   f. electronic filtering means positioned downstream from the first means for cyclonically treating a dirty air stream and upstream of the second means for further cyclonically treating the dirty air stream.

2. The vacuum cleaner as claimed in claim 1 wherein the vacuum cleaner has one first means and from two to five second means.

3. The vacuum cleaner as claimed in claim 1 wherein the second means for further cyclonically treating the dirty air stream removes particulate material larger than that which is removed by the electronic filtering means.

4. A vacuum cleaner comprising:
   a. a dirty air inlet for receiving air containing dirt;
   b. a clean air outlet spaced for the dirty air inlet;
   c. an air flow path extending downstream from the dirty air inlet to the clean air outlet and in flow communication with a source of suction; and,
   d. a filtration assembly positioned in the air flow path, the filtration assembly comprising:
      i. a first cyclonic cleaning stage and a second cleaning stage downstream from the first cyclonic cleaning stage; and,
      ii. at least one removable electrostatic filter, washable by water for reuse, positioned in the air flow path downstream from the first cyclonic cleaning stage and upstream of the second cleaning stage, wherein the second cleaning stage removes particulate material larger than that which is removed by the electrostatic filter.

5. The vacuum cleaner as claimed in claim 4 wherein the filter is an electrostatic precipitator.

6. The vacuum cleaner as claimed in claim 4 wherein the first cyclonic cleaning stage comprises one cyclone and the second cleaning stage consists of from two to five second cyclones.

7. The vacuum cleaner as claimed in claim 4 wherein the at least one cyclonic cleaning stage consists of one cyclone.

8. The vacuum cleaner as claimed in claim 4 wherein the at least one electrostatic filter is an electrostatic precipitator.

9. A vacuum cleaner comprising:
   a. a dirty air inlet for receiving air containing dirt;
   b. a clean air outlet spaced for the dirty air inlet;
   c. an air flow path extending downstream from the dirty air inlet to the clean air outlet and in communication with a source of suction; and,
   d. a filtration assembly positioned in the air flow path, the filtration assembly comprising:
      i. at least one cyclonic cleaning stage in flow communication with the dirty air inlet and having a partially cleaned air outlet; and,
      ii. at least one removable electrostatic filter, washable by water for reuse, positioned in the air flow path upstream from the source of suction.

10. The vacuum cleaner as claimed in claim 9 wherein the at least one cyclonic cleaning stage consists of one cyclone and the at least one electrostatic filter is positioned in the air flow path downstream of the cyclone.

11. The vacuum cleaner as claimed in claim 9 wherein the at least one cyclonic cleaning stage comprises a first cyclonic cleaning stage and a second cleaning stage is positioned downstream from the first cyclonic cleaning stage.

12. The vacuum cleaner as claimed in claim 11 wherein the at least one electrostatic filter is positioned in the air flow path downstream from the fist cyclonic cleaning stage and upstream of the second cleaning stage.

13. The vacuum cleaner as claimed in claim 11 wherein the at least one electrostatic filter is positioned in the air flow path downstream from the second cleaning stage.

14. The vacuum cleaner as claimed in claim 11 wherein the second cleaning stage removes particulate material larger than that which is removed by the at least one electrostatic filter.

15. The vacuum cleaner as claimed in claim 11 wherein the at least one electrostatic filter is an electrostatic precipitator.

* * * * *

UNITED STATES PATENT AND TRADEMARK OFFICE
CERTIFICATE OF CORRECTION

PATENT NO. : 6,238,451 B1
DATED : May 29, 2001
INVENTOR(S) : Conrad et al.

Page 1 of 1

It is certified that error appears in the above-identified patent and that said Letters Patent is hereby corrected as shown below:

<u>Column 8, claim 12,</u>
Line 14, delete "fist" and insert -- first --.

Signed and Sealed this

Twenty-ninth Day of January, 2002

Attest:

JAMES E. ROGAN
*Attesting Officer*     *Director of the United States Patent and Trademark Office*